United States Patent

Pilling et al.

[11] Patent Number: 5,357,369
[45] Date of Patent: Oct. 18, 1994

[54] WIDE-FIELD THREE-DIMENSIONAL VIEWING SYSTEM

[76] Inventors: Geoffrey Pilling, 1608 Skyline Dr., Fullerton, Calif. 92631; Max E. Tegmark, P.O. Box 4446, Berkeley, Calif. 94618; Edward Larmore, 1004 Parkside Dr., Apt. 108, Bremerton, Wash. 98310

[21] Appl. No.: 993,416

[22] Filed: Dec. 21, 1992

[51] Int. Cl.$^5$ .............................. G02B 27/22
[52] U.S. Cl. ..................... 359/462; 359/464; 359/466; 359/467; 359/471
[58] Field of Search ............. 358/88, 89, 92; 359/462, 464, 466, 467, 471, 472, 475, 477

[56] References Cited

U.S. PATENT DOCUMENTS 4,174,884  11/1979  Weissler ................. 359/472
4,568,970  2/1986  Rockstead ............... 359/471

*Primary Examiner*—Eugene R. LaRoche
*Assistant Examiner*—Huan Hoang
*Attorney, Agent, or Firm*—Plante, Strauss & Vanderburgh

[57] ABSTRACT

The invention is used with a display (10) of a left and right stereoscopic images in adjacent side-by-side array on a two-dimensional imaging surface such as the screen of a computer monitor or television. The left and right images (L and R) are rotated by 90 degrees in opposite directions from their normal upright orientations. A viewing device which includes a right pair of mirrors (2 and 4) and a left pair of mirrors (1 and 3) is placed between the viewer and the display. The mirrors are oriented at fixed and predetermined angular relationship to deflect the lines of sight from the viewer's eyes to the respective right and left images, and to rotate them by 90 degrees. As a result, the users left and right eyes see upright versions of the left and right images, respectively, creating a wide-field stereoscopic illusion of the images.

20 Claims, 4 Drawing Sheets

WIDE-FIELD THREE-DIMENSIONAL VIEWING SYSTEM

BACKGROUND OF THE INVENTION

1. Field of Invention

The present invention relates generally to stereoscopic viewing devices enabling a person to perceive three-dimensional images. Specifically, the invention can be used to upgrade a regular computer monitor or TV set to a powerful and affordable tool for visualizing three-dimensional graphics.

2. Description of Prior Art

The basic principle underlying all stereoscopic viewing devices is to arrange for the viewer's left and right eyes to see two separate images, differing in such a way that the resulting mental image is three-dimensional. A common feature of the multitude of such devices developed to date is lack of commercial success on the broad consumer market.

Methods where both images are printed interleaved, and the viewer is required to focus his eyes beyond them in order for them to be perceived as a single three-dimensional image, can cause eye-strain. Furthermore, some people are unable to use them at all, despite trying for several minutes.

Methods based on color light (known as anaglyphic), such as the familiar red and green viewing glasses used in experimental TV-broadcasts, cannot accurately reproduce color images and generally yield imperfect pictures because the filters fail to eliminate the complementary color completely.

Methods based on polarized light, such as U.S. Pat. No. 5,007,715 (Verhulst), tend to be prohibitively expensive for the home user, since they cannot be used with regular computer or TV screens, which emit unpolarized light.

Prohibitive costs also hamper methods involving rapidly moving parts, such as U.S. Pat. No. 366,823 (Ferry), a screen deformed in a lenticular fashion so that the left and right eyes see mutually exclusive parts of it, such as U.S. Pat. No. 4,959,641, or two separate screens, either in combinations with mirrors as in U.S. Pat. No. 5,023,912 (Sakariassen) or U.S. Pat. No. 4,743,964 (Allard et al.), or miniaturized and mounted on the viewer's head directly in front of the individual eyes as in U.S. Pat. No. 4,933,755 (Dahl et al.).

Time-divided viewing methods such as U.S. Pat. No. 4,907,860 (Noble), where liquid crystals alternately block out the left and right eyes, can cause flickering discomfort since at any time, in eye is viewing nothing. Also, at least half of the light is absorbed by the polarizer even when it is transparent, rendering the image rather dark.

The cheapest devices to manufacture are those using no other optical components than mirrors. An additional advantage is that these suffer from none of the reductions in viewing quality discussed above: their is full color, no flicker, virtually no loss of light, etc. Representative devices of this type are U.S. Pat. No. 4,674,845X (allowing 3D viewing through a microscope), U.S. Pat. No. 4,457,584 (primarily designed to be head-mounted and used at cinemas) and U.S. Pat. No. 5,101,269 (designed to view pairs of photographic slides and prints stereographically).

Unfortunately, none of these devices are suitable for superimposing the left and right halves of a standard computer monitor or TV screen in a way which is practical and allows the viewer to sit in an ergonomically acceptable position. Ideally, such a device should satisfy the following requirements:

a) The perceived image should still upper three-dimensional and undistorted if the viewer rotates his head slightly, as is inevitable during an extended period of use. This rules out mirrors mounted on the viewer's head.

b) When the devices is used with a computer monitor, the viewer should not be forced to bend down and hold his head straight in front of the screen, which would be required by a mirror arrangement such as U.S. Pat. No. 4,457,584 (Pryor) or U.S. Pat. No. 4,568,970 (Rockstead). Rather, an ergonomically sound posture should be allowed, where the user can sit fairly upright at a desk and view at a downward-slanting angle like during normal computer work.

c) The resulting three-dimensional image should have a shape similar to a normal screen, i.e. slightly broader than it is wide. To achieve this, the left and right halves of the screen would have to be not only superimposed, but also rotated by ninety degrees. No previously designed devices do this.

d) The device should be usable for a variety of screen sizes without requiring readjustment of its mirrors.

SUMMARY OF THE INVENTION

The present invention satisfies requirements a), b), c) and d) mentioned above. In addition, it is quite cheap to produce, as it required no moving parts and can be used with a variety of screen sizes without any adjustment.

The invention, from here on referred to as the wide-field viewing system, consists of four plane light deflection means (for instance mirrors) rigidly mounted relative to each other.

The invention is used with a display of left and right stereoscopic images in adjacent side-by-side array on a two-dimensional imaging surface such as the screen of a computer monitor or television, which has a greater width than height. The left and right images are displayed in a rotated fashion, rotated by 90 degrees in opposite directions from their normal upright orientations. A viewing device which includes a right pair of mirrors and a left pair of mirrors is placed between the viewer and the display. The mirrors are oriented at fixed and predetermined angular relationships to deflect the lines of sight from each of the viewer's eyes to the respective right and left images, and to rotate each of said lines of sight by 90 degrees. The net result is that the users left and right eyes see upright versions of the left and right images, respectively, creating a wide-field view, i.e. wider than high, stereoscopic illusion of the images.

General formulas for their shapes, sizes, positions and orientation angles are given in the following description of the preferred embodiment.

Simply attaching the viewing device to the front of an imaging surface (such as a computer monitor or TV screen) converts the latter into a powerful and affordable tool for visualizing three-dimensional graphics.

DESCRIPTION OF THE DRAWINGS

The invention will be described with reference to the figures, of which.

DESCRIPTION OF PREFERRED EMBODIMENTS

This invention comprises a viewing device for obtaining a wide-field stereoscopic illusion in which the field of view has a greater width than height. The viewing device is useful with conventional, two-dimensional imaging surfaces that have a greater width than height, such as the monitors (i.e. cathode ray tubes) or liquid crystal displays used in computers and television sets, and most projection screens.

Figure 1:
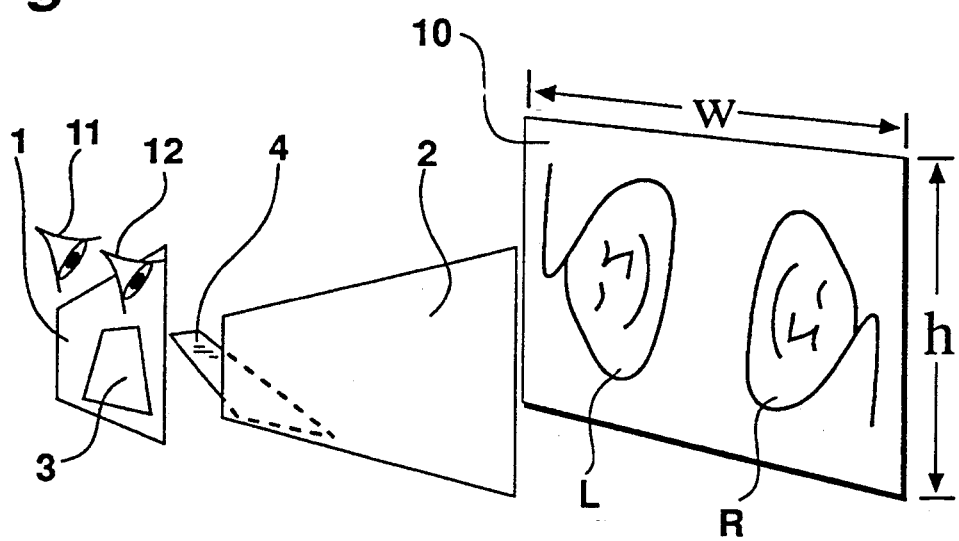
FIG. 1 shows the relative locations and orientations of the four light deflection means in accordance with one embodiment of the invention.

As shown in FIG. 1, the left stereoscopic image L and right stereoscopic image R are displayed, in adjacent side-by-side array, on the two-dimensional imaging surface, the screen 10, with the left image L rotated 90 degrees counter-clockwise, and the right image R rotated 90 degrees clockwise from an normal display to the viewer. The two-dimensional imaging surface 10 has a greater width w than height h, as is conventional with imaging surfaces such as cathode ray tubes or liquid crystal displays used in computers and television sets, and most projection screens. The preferred application of the invention is with a computer screen.

The viewing device includes a right pair of mirrors 2 and 4, and a left pair of mirrors 1 and 3, which are placed between the viewer, depicted as eyes 11 and 12, and the display on screen 10. Each pair of mirrors includes a primary and secondary mirror. Mirrors 1 and 2 are primary mirrors and 3 and 4 are secondary mirrors. The mirrors are oriented at fixed and predetermined angular relationships to deflect the lines of sight from each of a viewer's eyes as 11 and 12 from the secondary to the primary mirrors, and from the primary mirrors to the respective left and right images.

Figure 2:
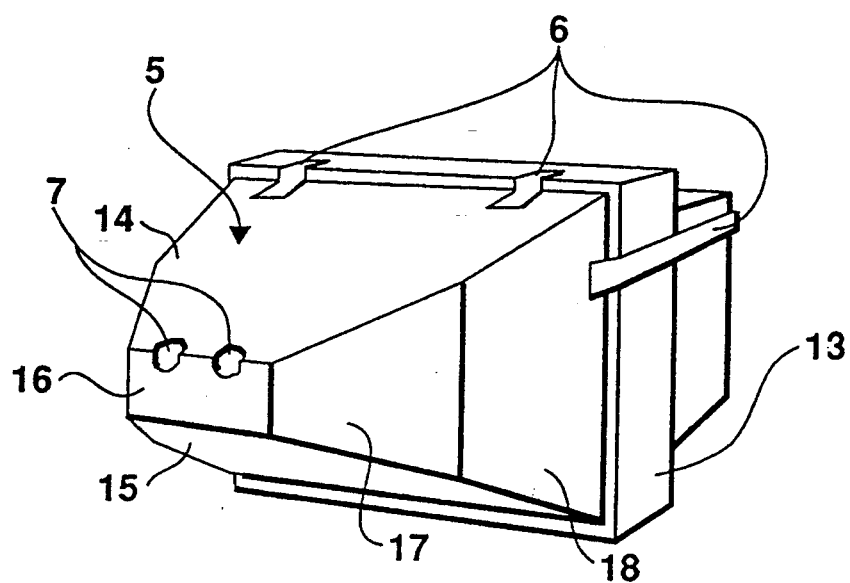
FIG. 2 shows an example of a protective casing for the light deflection means in FIG. 1, as well as an example of means for attaching the unit to a computer monitor or television screen.

FIG. 2 illustrates the device as applied to a television or computer monitor 13. The viewing device includes a protective casing 5 which fits over the screen 10 of the monitor and is secured thereto with suitable fastening means 6, e.g. Velcro fabric tabs. The casing 5 has a truncated, generally pyramidal shape with planar top 14 and bottom 15, and sides with planar portions 16, 17 and 18 which are at different angular inclinations. This specific exterior shape is by no means critical to the invention. However, it simplifies construction, as the inclinations of portions 17 are the same as those of the primary mirrors 1 and 2 (see FIG. 1), which can hence be affixed directly on their interior walls. A pair of apertures 7 are provided in the end wall 16 and top wall 14 as eye openings for the viewer.

Figure 3:
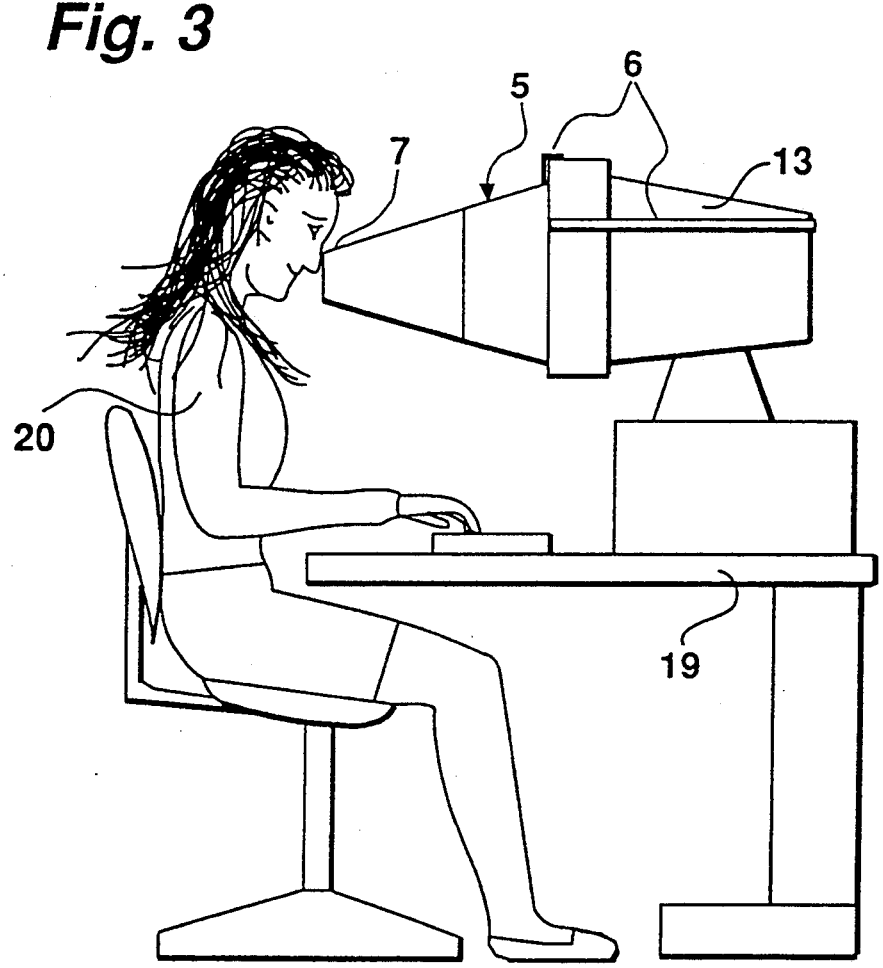
FIG. 3 shows an example of an embodiment of the invention used in a typical computer situation.

In FIG. 3, the device is shown mounted on a computer monitor 13 which is in a conventional position on top of a desk 19. The viewing device locates the eye openings 7 at positions where the user 20 can maintain an ergonomically sound posture. This is achieved since the viewing device provides a downward slanting viewing angle.

Figure 4:
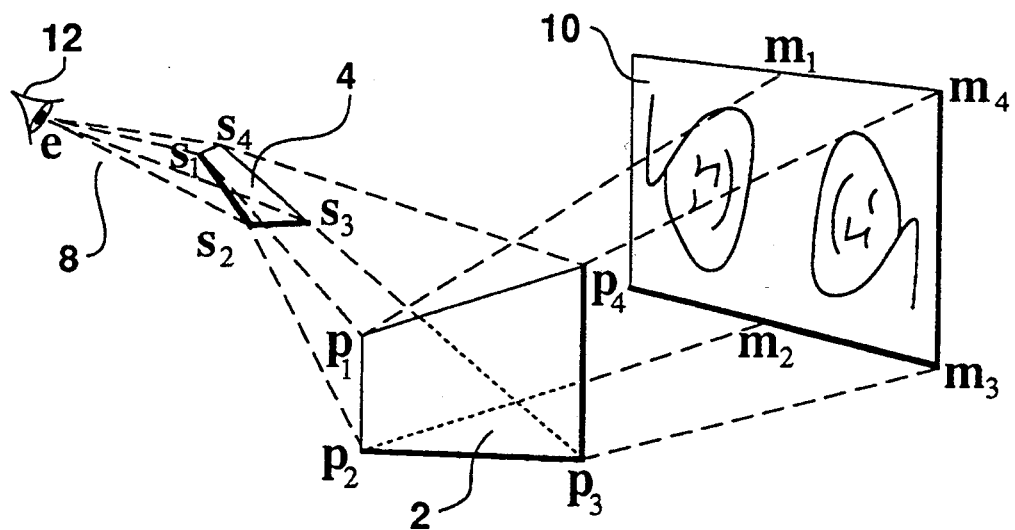
FIG. 4 is a schematic view of the right primary and secondary reflectors. Its purpose is to mathematically define the points $m_1$, $m_2$, $m_3$, $m_4$, $p_1$, $p_2$, $p_3$, $p_4$, $s_1$, $s_2$, $s_3$, $s_4$, and e.

FIG. 4 (not drawn to scale) schematically shows the locations of the primary mirror 2 and secondary mirror 4 for the right line of sight, from the viewer's right eye 12. The exterior borders of the line of sight of the viewer's right eye 12 are depicted by the four dashed lines which are generally referred to as 8. These four lines are reflected at the corners $s_1$, $s_2$, $s_3$ and $s_4$ of the secondary mirror 4, and subsequently reflected at the corners $p_1$, $p_2$, $p_3$ and $p_4$ of the primary mirror 2, to finally terminate at the points $m_1$, $m_2$, $m_3$ and $m_4$ on the screen 10.

Figure 5:
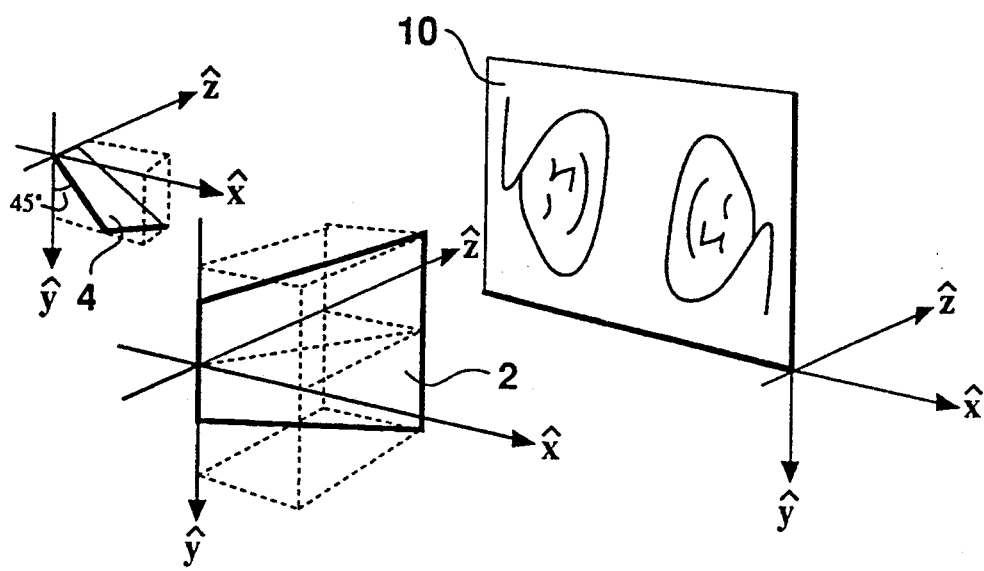
FIG. 5 gives the same schematic view of the right primary and secondary reflectors, but with coordinate axes and help lines to illustrate their orientation in space.

FIG. 5 illustrates the primary mirror 2 and secondary mirror 4 for the right line of sight and the display screen 10 with the directions of the coordinate axes $\hat{x}$, $\hat{y}$ and $\hat{z}$ shown by each of the mirrors and by the display screen.

Figure 6:
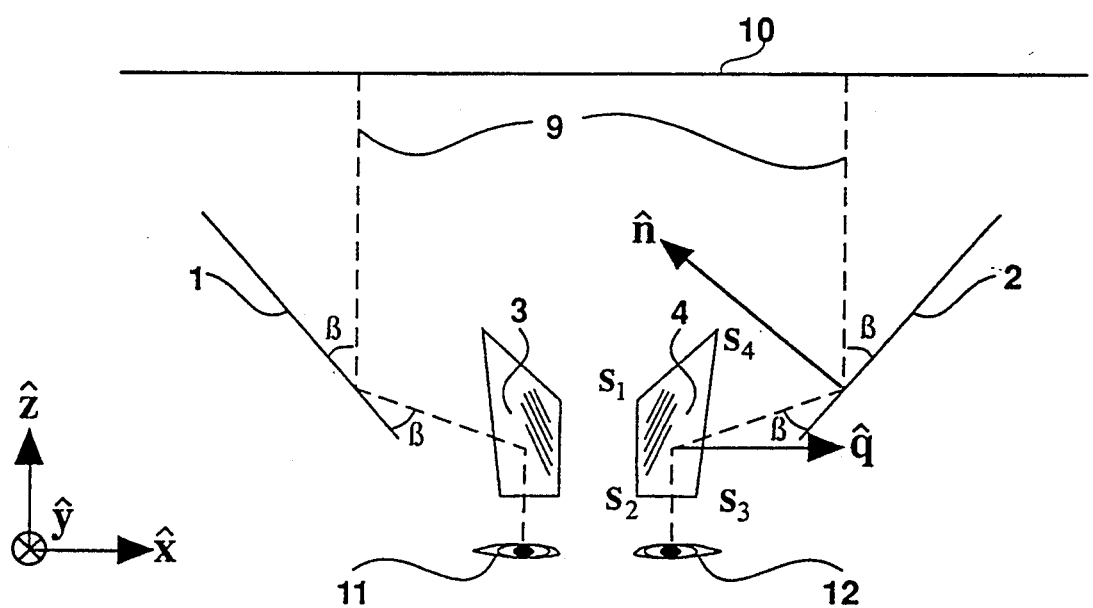
FIG. 6 is a schematic top view of the four reflectors. Its purpose is to mathematically define the angle $\beta$ and the vectors $\hat{n}$ and $\hat{q}$, the mirrors normals.

FIG. 6 is a top view of both left and right pairs of mirrors and display screen. The central lines of sight from the viewer's left and right eyes 11 and 12 are depicted as two dashed lines which are generally referred to as 9. These two lines are reflected by the respective secondary mirror 3 or 4, then reflected by the respective primary mirror 1 or 2, and finally impinge normally on the screen 10.

From FIGS. 5 and 6, it is apparent that in the illustrated embodiment, the primary mirrors 1 and 2 are oriented vertically, i.e. parallel to the y-axis (see FIG. 5), and make an angle $\beta$ with z-axis that is exactly half of the downward slanting viewing angle, whereas the secondary mirrors are perpendicular to the screen 10 and make a 45 degree angle with the y-axis.

Since a key part of this invention is the precise description of the positions, orientations and shapes of the four reflectors, a number of mathematical formulas will be given below. Although the mathematical notation should be familiar to those skilled in the art, we will nonetheless start with a few words about notation to avoid confusion.

We specify points in space by triplets of numbers, their x-coordinate, their y-coordinate and their z-coordinate, respectively. We write points (vectors) in boldface and denote their three coordinates by subscripts, i.e.

$$r=(r_x, r_y, r_z).$$

The origin of our coordinate system is midway between the two eyes (pupil centers, to be precise) of the viewer. The there axes are defined in FIGS. 5 and 6: the x-axis points towards the viewer's right, the y-axis points down (into the page as drawn in FIG. 6) and the z-axis points toward the imaging surface. A normal vector to a reflector is a vector perpendicular to the reflector, pointing in the same direction as a light ray going straight away from it.

1. The most general wide-field viewing system
    We use the following mathematical symbols:

$$\begin{cases} \hat{n} = \text{normal vector to right primary reflector} \\ \hat{q} = \text{normal vector to right secondary reflector} \\ p_i = \text{positions of corners of right primary reflector} \\ s_i = \text{positions of corners of right secondary reflector} \\ m_i = \text{positions of corners of right half of imaging surface} \\ e = \text{position of right eye} \\ R = \text{actual distance from eye to imaging surface} \\ d = \text{distance between eyes} \\ f = \text{distance from eyes to secondary mirrors along rays 9} \\ w = \text{width of imaging surface} \\ h = \text{height of imaging surface} \end{cases}$$

Here and below, the letter i denotes any of the numbers 1, 2, 3, or 4. The positions and orientations of the left primary and secondary mirror are given by symmetry: All y- and z-coordinates are identical, whereas all x-coordinates have an extra minus sign in front.

In order for the wide-field viewing system to function, the left and right images must appear superimposed. This means that the left image, seen only by the viewer's left eye, should appear to be located in the same pulse as the right image, seen only by the viewer's right eye. This superimposing can be achieved by means of two-successive reflections of the line of sight, a principle somewhat resembling that of a periscope. However, in addition to superimposing the images, the wide-field viewer must also rotate them. We will first give the constraints that this imposes on the angular orientations of the light deflection means (mirrors, say) and then turn to the constraints on their locations and shapes.

The superimposed left and right images must appear to lie in the same plane. This implies that the two light rays 9 that emanate straight out from the left and right images must be parallel again after being reflected in the primary and secondary mirrors. A straightforward ray tracing calculation shows that this is equivalent to requiring that the mirrors be oriented so that $$n_x n_z + q_x q_z - 2(n_x q_x + n_y q_y + n_z q_x)n_z q_x = 0.$$

Since the mirror orientations are determined only by the directions of the normal vectors n and q, not by their lengths, we take them to be normalized so that $$n_x^2 + n_y^2 + n_z^2 = 1, \tag{2}$$

$$q_x^2 + q_y^2 + q_z^2 = 1. \tag{3}$$

For vectors $\hat{n}$ and $\hat{q}$ satisfying Equation (1), the images seen by the right and left eye will in general appear rotated around the z-axis. For the rotation angle to be exactly ninety degrees, $\hat{n}$ and $\hat{q}$ must satisfy the additional constraint $$1 - 2(n_x^2 + q_x^2) + 4n_x q_x(n_x q_x + n_y q_y + n_z q_z) = 0 \tag{4}$$

There are no further constrains of the orientations (i.e. angles) of the reflectors.

The constraint on the positions of the reflectors, is that $p_1, p_2, p_3, p_4, s_1, s_2, s_3,$ and $s_4$ must be such that the left and right eyes see the left and right screen halves images exactly superimposed, given the screen dimensions w and h, the eye separation d and the choices of R and f.

Finally, to minimize the weight and production cost of the device, it is usually preferable for the reflectors to be as small as possible. This is also important to prevent the secondary mirror from partially obscuring the primary. Their optical shapes are determined by tracing the four rays 8 illustrated in FIG. 4 and are given by formulas below for one particularly simple embodiment.

Although any choices of $\hat{n}$ and $\hat{q}$ satisfy the four Equations (1), (2), (3) and (4) can be used for a wide-field viewing system, we which to mention a simple special case that is especially easy and cheap to build.

2. An especially simple embodiment

This is the case where the primary mirrors are vertical, as illustrated in FIG. 5. This embodiment is specified by the angle $\beta$, which is the angle that the primary mirrors make with the z-axis, and given by $$\begin{cases} \hat{n} = (-\cos\beta, 0, \sin\beta), \\ \hat{q} = \left(\frac{1}{\sqrt{2}}, -\frac{1}{\sqrt{2}}, 0\right), \\ e = \left(\frac{d}{2}, 0, 0\right), \\ m_1 = \left(0, f\sin 2\beta - \frac{d}{2} - \frac{h}{2}, R\right), \\ m_2 = \left(0, f\sin 2\beta - \frac{d}{2} + \frac{h}{2}, R\right), \\ m_3 = \left(\frac{w}{2}, f\sin 2\beta - \frac{d}{2} + \frac{h}{2}, R\right), \\ m_4 = \left(\frac{w}{2}, f\sin 2\beta - \frac{d}{2} - \frac{h}{2}, R\right), \\ p_i = b + (m_i - b)t_i, \\ s_i = a + (p_i - a)u_i, \end{cases} \tag{5a}$$

where for brevity we have introduced the variables $$\begin{cases} a = \left(\frac{d}{2} - f\sin 2\beta, f\sin 2\beta, 0\right), \\ b = \left(\frac{w}{4}, f\sin 2\beta, (f+g)(\cos 2\beta - 1)\right), \\ t_i = \frac{f+g}{R - (f+g)(\cos 2\beta - 1) + (w/4 - m_{ix})\cot 2\beta}, \\ u_i = \frac{f\sin 2\beta}{p_{ix} - p_{iy} + 2f\sin 2\beta - \frac{d}{2}}, \\ g = \left(\frac{w}{4} - \frac{d}{2}\right)\frac{1}{\sin 2\beta}. \end{cases} \tag{5b}$$

Here the dimensions w and h of the imaging surface, the distances d and R can be chosen arbitrarily. The angle $\beta$ can chosen anywhere between zero and 45 degrees. As in seen above, the secondary mirror is perpendicular to the imaging surface and slopes downward by forty-five degrees. The viewing angle, the angle by which the viewer looks down, is $2\beta$.

In this especially simple embodiment, the following is an example of parameters that work well with a 14 inch monitor: R=12", d=2.5Δ, f=2", w=12.5", h=9.5", and $\beta = 30°$. As will be apparent to those skilled in the art, this is merely one example among many, and these parameters can be given entirely different values without departing from the spirit and scope of the invention.

3. Protective casing

An optional protective casing such as that depicted in FIGS. 2 and 3 serves several purposes when the device is used with a television or computer monitor:

It eliminates light from the surrounding, thereby enabling the viewer to experience the three-dimensional image surrounded by darkness, without distraction from screen reflections or the material surrounding the monitor.

It holds the reflectors in place. In the casing in FIG. 2, the primary reflectors can be attached directly to the inside walls of the casing and the secondary mirrors can be attached directly to the front and bottom walls.

It protects the reflectors.

While we have shown but one embodiment of the protective casing, it will be apparent to those skilled in the area that the casing is of only secondary importance and can be modified arbitrarily without departing from the spirit and scope of the invention. The same applies to the means of attachment of the casing to the computer monitor or television screen.

4. Magnification

An optional feature of the wide-field viewing system is to include a system of lenses or curved mirrors that magnify the left and right image. This would have the advantage of making the resulting three-dimensional image occupy a larger fraction of the viewer's field of view, thus enhancing the three-dimensional experience. The drawback of such a system is that it would be more expensive to produce. There are a number of different ways in which lenses and/or curved mirrors can be combined to produce the desired magnification. However, as will be apparent to those skilled in the art, such modifications are of merely secondary importance and would not constitute a departure from the spirit and scope of the invention.

5. The computer algorithm

Whereas use of our invention for three-dimensional television viewing would be geared mainly towards recreation and entertainment, its use with computers makes numerous commercially useful applications possible. Three-dimensional graphics for Computer-Aided Design (CAD), three-dimensional simulations for training of drivers and pilots, digitized maps using the third dimension to show elevation, and educational software illustrating mathematics, physics and chemistry problems in three-dimensions are but a few—not to mention three-dimensional computer games.

As is well-known in the art, it is straightforward to figure out what to display as the left and right stereoscopic images when reproducing photographic images: one should simply display the images obtained by two video cameras that are separated by two and a half inches (the typical separation between people's eyes). For our invention, the two images should in addition be rotated by 90 degrees in opposite directions before they are displayed. When generating a three-dimensional computer image, however, an algorithm is needed to compute where on the left and right screen halves to split the pixel corresponding to a point at coordinates (x, y, z) in three-dimensional space. Table 1 contains a procedure in the computer language PASCAL that implements such an algorithm. To create the appearance of a dot at the point (x, y, z) in three-dimensional space when the wide-field viewing system is used, the procedure listed in Table 1 should be used to compute the four integers leftx, lefty, rightx and righty, after which the two pixels with coordinates (leftx, lefty) and (rightx, righty) on the computer monitor should be switched on. This algorithm is optimal in the sense that is maps straight lines in three-dimensional space onto straight lines on the screen. As will be clear to those skilled in the art, this particular implementation is merely an example, and the minor details and the choice of programming language can be altered without departing from the spirit and scope of the invention. What is important is the mathematical algorithm.

The x-, y- and z-axes of the coordinate system used is the same as that defined in FIGS. 5 and 6, but the origin is moved to the center of the screen. All distances are measured in inches. While the constants given are appropriate for the specific example of a 14 inch VGA monitor, it will be apparent to those skilled in the art that these constants can be modified for monitors with any size, shape and resolution without departing from the spirit and scope of the invention.

Advantages of wide-field viewing system

The main novelty of the invention lies in the fact that the left and right halves of the imaging surface, containing the images to be viewed by the left and right eyes, respectively, are perceived by the viewer not merely as superimposed, but also as rotated by ninety degrees.

When used with a computer monitor or televisions screen, our wide-field viewing system has the following four important advantages over narrow-field viewing systems:

Advantage 1: Wide field of view

When attached to a computer monitor or television screen, the field of view of a narrow-field system is narrower than it is high, since the field of view is simply the left/right half of the screen. With the wide-field system, on the contrary, the field of view is wider than it is high, is just the same way that the normal field of view of our eyes is wider than it is high. Since it is the width of an image rather than its height that enhances the effect of three-dimensionality, the wide-field system can thus produce a more powerful three-dimensional experience.

Advantage 2: Works all screen sizes without adjustment

A narrow-field viewing system must contain a adjustable reflectors to be able to function with more than one screen width, since the distance that the two images must be translated sideways differs from screen to screen. Perhaps surprisingly, this is not so for the wide-field viewer. It works for all screens smaller than the maximum size it is dimensioned for, and can thus be built lightly and cheaply without an adjustable parts.

Advantage 3: Ergonomically sound

Computer monitors are generally placed below the user's eye-level, with their screen approximately vertical. Since a user of three-dimensional computer software is likely to use the computer also for a variety of regular non-3D applications such as word processing, it is advantageous if one is not required to physically move one's monitor around whenever one wants to use the three-dimensional viewing device. Unfortunately, the narrow-field viewing devices patented by Pryor and Rockstead require the user to look perpendicularly towards the screen. This would require one to stoop forward in a very awkward position with one's neck bent backwards in order to hold one's face straight in front of the monitor.

With the wide-field viewing device, on the other hand, the user looks in a comfortably downward-slanting angle. This enables one to maintain an ergonomically sound posture while doing three-dimensional computer work; see FIG. 3.

Advantage 41: Circumvents non-linearities

Many computer monitors and television screens are slightly non-linear in the sense that their pixel widths and pixel heights depend on the distance from the center of the screen. This imperfection can cause narrow-field viewing systems to yield poorly superimposed images and eye strain. Since the wide-field system rotates the two images in opposite directions, it superimposes pixels on diametrically opposite sides of the center of the screen and hence cancels out the main source of distortion.

TABLE 1

```
const { For the special case of a 14 inch VGA monitor in high-
resolution mode. }
                         { All distances are in inches. }
L           = 1.25;  { Half of distance between eyes }
D           = 12;    { Optical distance from eyes to screen }
xpixels     = 640;
mMidLeft    = 160;   { 0.25 * 640 pixels }
xMidRight   = 480;   { 0.75 * 640 pixels }
yMid        = 240;   { 0.5 * 480 pixels }
xPixPerInch = 70.0;  { 640/w }
yPixPerInch = 70.0;  { 480/h }
procedure WideFieldProject (x, y, z: real; var leftx, lefty, rightx,
righty; integer);
var
temp: real;
begin
temp := 1 / (1 + z / D);
leftx := xmidleft + round(xPixPerInch * temp * y);
lefty := yMid − round(yPixPerInch * (temp * (x + L) − L));
rightx := xpixels − leftx;
righty := yMid + round(xPixPerInch * (temp * (x − L) + L));
end;
```

Having thus described the invention, we claim:

1. In a stereoscopic display and viewing system, wherein a pair of left and right stereoscopic images are displayed in adjacent side-by-side array on a two dimensional rectangular imaging surface, the improved display and viewing means which comprises:
   (a) left and right stereoscopic images displayed in a sideways fashion on said imaging surface, the two images rotated about the normal to said imaging surface in opposite directions by 90 degrees from their usual upright orientations; and
   (b) viewing means comprising a right pair of light deflection means and a left pair of light deflection means, with respective means of support to secure said light deflection means between a viewer and said imaging surface, said light deflection means being held at fixed and predetermined angular relationships so as to deflect the lines of sight to each of a viewer's eyes from the respective stereoscopic image, in such a manner that the projected views of the left and right images appear rotated by 90 degrees in opposite directions into a normal upright orientation and shifted so as to appear merged in front of the viewer, thereby creating the stereoscopic illusion of depth from said images.

2. The stereoscopic display and viewing system of claim 1 wherein said imaging surface is a video screen.

3. The stereoscopic display and viewing system of claim 2 wherein said video screen is a screen of a cathode ray tube.

4. The stereoscopic display and viewing system of claim 2 wherein said video screen is a liquid crystal display.

5. The stereoscopic display and viewing system of claim 1 wherein said imaging surface has a width to height ratio ranging from 1.1 to about 1.8.

6. The stereoscopic display and viewing system of claim 1 wherein said imaging surface is a pair of images reproduced on paper.

7. The stereoscopic display and viewing system of claim 1 wherein said light deflection means are prisms.

8. The stereoscopic display and viewing system of claim 1 wherein said light deflection means are mirrors.

9. The stereoscopic display and viewing system of claim 1 wherein each of said pairs of light deflection means consists of a primary flat surface reflector positioned near said imaging surface and a secondary flat surface reflector positioned near the viewer's eyes, whereby the primary surface normal n and the secondary surface normal q satisfy:

$$n_x n_z + q_x q_z - 2(\hat{n}\cdot\hat{q})n_z q_x = 0;\ 1 - 2(n_x^2 + q_x^2) + 4(\hat{n}\cdot\hat{q})n_x q_x = 0$$

where the x, y, and z axes are defined, relative to said imaging surface in the usual upright orientation, to be in the horizontal, vertical, and normal directions respectively.

10. The stereoscopic display and viewing system of claim 9 wherein
   (a) each of said secondary reflectors is perpendicular to said imaging surface and is oriented at a 45 degree angle relative to the vertical axis of said imaging surface.
   (b) each of said primary reflectors is oriented vertically relative to said imaging surface, at a horizontal angle relative to the normal of said imaging surface that is exactly half of the vertical angle between the normal of said imaging surface and the viewer's line of sight.

11. The stereoscopic display and viewing system of claim 2 wherein said light deflection means are mirrors and including a housing surrounding said mirrors and said means of support.

12. The stereoscopic display and viewing system of claim 11 wherein said housing has a frontal structure including view ports for the right and left eyes of a viewer.

13. The stereoscopic display and viewing system of claim 11 wherein said mirrors are reflective inside surfaces of selected sidewalls of said housing.

14. The stereoscopic display and viewing system of claim 11 wherein said housing, mirrors and supports are a subassembly which is removably attached to said video screen.

15. The stereoscopic display and viewing system of claim 11 wherein said housing, mirrors and supports are a subassembly equipped with a stand or other means of support suitable for placement in front of said imaging surface.

16. The stereoscopic display and viewing system of claim 1 wherein said viewing means is equipped with a means for being mounted on the viewer's head.

17. The stereoscopic display and viewing system of claim 1 wherein said viewing means includes a system of lenses such that said images are magnified to occupy a larger fraction of the viewer's field of view.

18. The stereoscopic display and viewing system of claim 1 wherein said viewing means includes a system of curved reflectors such that said images are magnified to occupy a larger fraction of the viewer's field of view.

19. A method for producing left and right stereoscopic images rotated by 90 degrees counter-clockwise and clockwise, respectively, on the left and right halves of a computer monitor with screen width w, screen height h and resolution W pixels by H pixels, where each point (x, y, z) in a three-dimensional space defined in a computer program is mapped onto the two pixels ($x_1$, $y_1$) and ($x_2$, $y_2$) on said monitor according to the following formulas:

$$\begin{cases} x_1 = W\left[\frac{1}{4} + \frac{y}{w(1 + z/D)}\right], \\ y_1 = H\left[\frac{1}{2} - \frac{(x + L)}{h(1 + z/D)} + \frac{L}{h}\right], \\ x_2 = W - x_1, \\ y_2 = H\left[\frac{1}{2} + \frac{(x - L)}{h(1 + z/D)} + \frac{L}{h}\right], \end{cases}$$

where L is half of the distance between the viewers eyes, D is the optical distance from the eyes to the screen and where the pixel coordinates $x_1$, $y_1$, $x_2$ and $y_2$ are rounded to the nearest integer values.

20. The method of claim 19 where said computer monitor is a 14 inch monitor with pixel resolution of 640 by 480 and W=640, W=480, H=9½", h=7", L=1¼" and D=12".

* * * * *